April 5, 1960  W. V. GREEN  2,931,729
METHOD AND APPARATUS FOR PREPARING CHEESE FOR PACKAGING
Filed Dec. 26, 1950
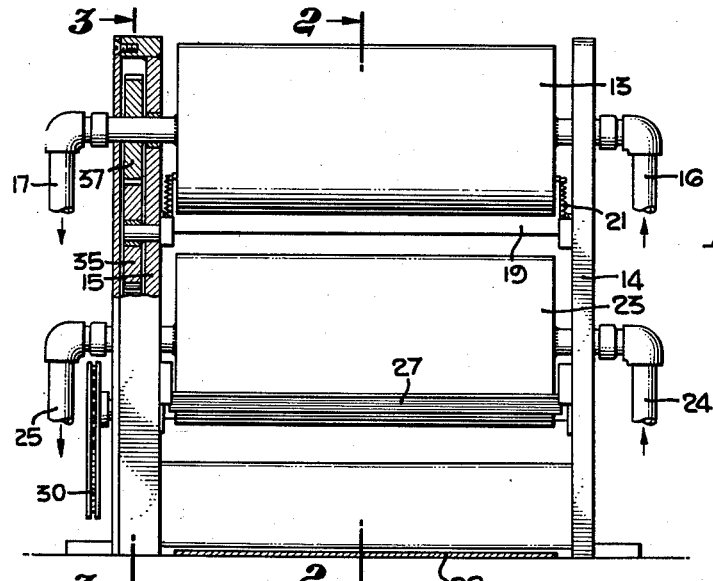
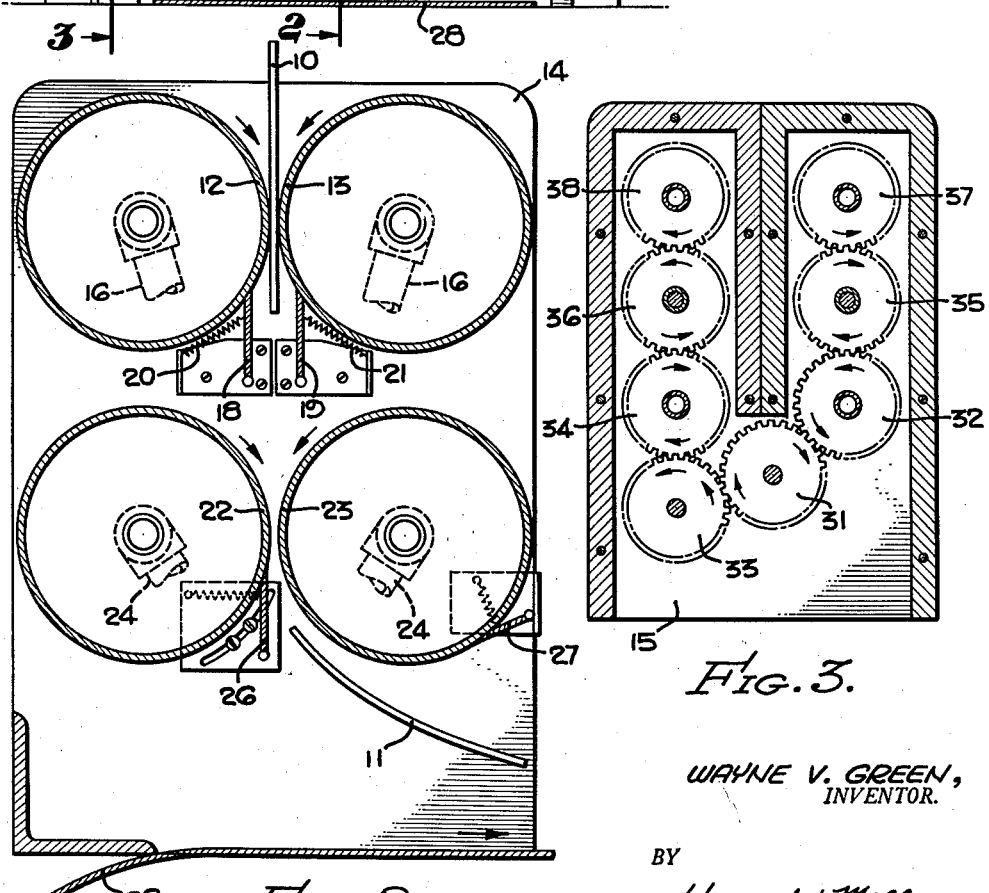
WAYNE V. GREEN,
INVENTOR.
BY
Hazard & Miller
ATTORNEYS

2,931,729

METHOD AND APPARATUS FOR PREPARING CHEESE FOR PACKAGING

Wayne V. Green, Pocatello, Idaho, assignor to Challenge Cream & Butter Association, Los Angeles, Calif., a corporation of California Application December 26, 1950, Serial No. 202,656

9 Claims. (Cl. 99—115)

This invention relates to a method and apparatus of preparing cheese for packaging. It is especially applicable to the packaging of "process" cheese.

Process cheese is produced in a number of different manners but essentially the process consists of melting natural cheese and taking suitable precautions to prevent excessive separation of butter fat therefrom. Frequently process cheese is produced by melting together a blend of several natural cheeses which, when molten, are either poured into the containers into which the cheese is to be ultimately sold, or poured into molds and after solidifying the cheese is then divided and packaged.

It has long been desirable to package cheese in the form of a stack of individual slices of the size and shape and appropriate thickness for sandwich making. However, if process cheese is merely sliced into individual slices and a stack of the slices is then wrapped to prepare a package, the individual slices quickly coalesce or unite with each other to such an extent that the individuality of the slices is not preserved. It is not ordinarily feasible to place separators such as wax paper sheets between the individual slices. Usually the thickness of the slices desired for sandwich making is in the neighborhood of about one-eighth inch and if the process cheese is merely sliced into slices of this thickness and a stack of the slices in direct contact with each other is then wrapped, in a short period of time the slices will again unite and adhere to each other so firmly that it is either impossible to separate the individual slices without breaking the slices or it is necessary to resort to re-slicing in order to separate the slices from each other.

A primary object of the present invention is to provide a method and apparatus for preparing or treating slices of cheese so that when the slices are assembled together in direct contact with each other and in stacked relationship and are wrapped into packaged form the slices will not coalesce but will retain their individuality so that they may be readily separated from each other even after a considerable shelf life of the package.

Another object of the invention is to so treat the slices of cheese that the growth of molds between the individual slices will be greatly retarded or inhibited.

With the foregoing and other objects in view, which will be made manifest in the following detailed description and specifically pointed out in the appended claims, reference is had to the accompanying drawings for an illustrative embodiment of the invention wherein:

Figure 1 is a view in elevation, parts being broken away and shown in vertical section of an apparatus embodying the present invention;

Fig. 2 is a sectional view taken substantially upon the line 2—2 upon Fig. 1; and Fig. 3 is a sectional view taken substantially upon the line 3—3 upon Fig. 1.

In preparing cheese for packaging in accordance with the present invention the cheese is first processed in any conventional or preferred manner and the molten cheese mass is then poured into a suitable mold and allowed to cool and solidify. When solidified it is then cut into loaves having a transverse cross sectional size and shape to conform to the size and shape of the desired finished slices. These loaves are then transversely sliced in any preferred manner into slices of the desired thickness, one of such slices being indicated on the drawing at 10 and another at 11.

The apparatus embodying the present invention consists of a pair of opposed upper rolls 12 and 13 which are spaced from each other slightly less than the thickness of the slice 10 so that as the slice 10 passes therebetween it will be engaged by the surfaces of these rolls. The spacing of the rolls, however, should not be so much smaller than the thickness of the slice 10 as to crush the slice as it passes therebetween. The rolls 12 and 13 are rotatably mounted on standards 14 and 15 and are hollow, enabling hot water or other hot fluid to be passed therethrough by means of conduits 16 and 17. In the case of the usual process cheese the temperature of these rolls is maintained at approximately 180° F. The function of these rolls as the slice passes therebetween is to heat the side faces of the slice sufficiently to melt and draw some of the butter fat therein to the surface. The rolls are rotated at a speed so that the cheese slice remains in contact therewith for approximately one-fourth of a second, the purpose being not to re-melt the entire slice or even to heat it through but to merely heat the cheese adjacent the side faces sufficiently so that the butter fat constituent will be drawn to the surface. Thus as the slice passes from between the rolls each slice will have on its side faces a thin film of butter fat. The slices are prevented from adhering to the rolls and from following around either of the rolls during their rotation such as by means of scrapers 18 and 19 pivotally mounted beneath the rolls and urged into engagement therewith such as by tension springs 20 and 21. In lieu of these scrapers other scraping means may be employed such as wires stretched adjacent the rolls and held in direct contact therewith. The slices thus treated may be allowed to fall directly onto a stainless steel endless belt 28 and on cooling to room temperatures the slices may be collected, assembled in stacked relationship, and wrapped. I prefer, however, to arrange immediately beneath the rolls 12 and 13 a second pair of opposed rolls 22 and 23 which are similarly spaced from each other and which are likewise hollow. These rolls are maintained in a chilled condition by the passage of a cold brine or salt water therethrough such as by conduits 24 and 25. These rolls may be equipped with scrapers 26 and 27 or, in lieu thereof, scrapping wires may be employed. Sometimes it is advantageous to locate the scraper 27 as illustrated so that the slice 11 which has just passed between the chilled rolls will tend to follow the roll 23 and fall flatwise on the belt 28.

Whether the butter fat film drawn to the surface on both sides of the slice is quickly chilled by means of the chilled rolls 22 and 23 or whether the slice is merely allowed to cool naturally to room temperatures, the butter fat film thereon seems to adequately prevent the slices from adhering to each other excessively when they are ultimately packaged. There is some adhesion between the individual slices in the final package despite the presence of the butter fat film but such adhesion is not of such character that it prevents the slices from being separated from each other at the time of use without breaking of the slices or resorting to reslicing.

The rolls 12, 13, 22 and 23 are continuously driven at uniform speed. As illustrated an endless chain 30 driven from any suitable source of power drives a sprocket on a shaft carrying a gear 31. This gear meshes directly with a gear 32 on roll 23. An idler 33 is interposed between the gear 31 and the gear 34 on roll 22. Idlers 35 and 36 provide driving connections between the gears 32 and 34 and the gears 37 and 38, respectively. As all of these gears are of the same size the rolls will be driven at the same speed of rotation.

The slices 10 and 11 are fed between the rolls 12 and 13 in any suitable manner and as they pass between the rolls a small film of butter fat is drawn to the surface by the heat of the rolls 12 and 13. This film will be very quickly solidified and kept from being re-absorbed by the cheese slice if the slice is immediately thereafter passed between the chilled rolls 22 and 23 but even if the slice is permitted to fall directly from between the rolls 12 and 13 onto the belt 28 and the butter fat film allowed to cool naturally to room temperatures, an adequate butter fat film will be ordinarily retained on the faces of each slice.

After the slices have been deposited on the conveyor belt 28 they are cooled and assembled in stacked relation to form a suitable package and are wrapped with a wrapper. The wrapper employed may be of any conventional type.

It has been proposed to utilize wrappers for wrapping cheese which have been chemically treated to prevent or retard mold growth. At the present time such wrappers have not been universally accepted by the trade. It is not essential to the present invention that such wrappers be employed inasmuch as a conventional wrapper may be used if desired. The presence of the butter fat film on the side faces tends to retard mold growth between the slices of the cheese and while the edges of the slices ordinarily do not have the protecting butter fat film to retard mold growth thereon, this is not objectionable in that the edges can be readily trimmed at the time of use if mold has been developed. If a treated wrapper that is chemically treated to inhibit mold growth ultimately proves acceptable the wrapper will, of course, engage the edges of the slices and protect the edges against mold growth even though the edges are not protected by the butter fat film.

From the above described method and apparatus it will be appreciated that it is possible to produce process cheese and after the same has been solidified on cooling to slice it into the desired size and shape. The slices when treated in accordance with the invention herein disclosed are capable of being packed in side-by-side relationship in direct contact with each other without danger of coalescing or uniting to such an extent that subsequent separation of the slices is difficult. In addition the same treatment of the slices renders their side faces such that mold growth thereon is greatly retarded. The butter fat film drawn to the surface of each slice is so thin that the appearance of the slices at the time of use is virtually identical with that of freshly sliced cheese.

Various changes may be made in the details of construction without departing from the spirit and scope of the invention as defined by the appended claims.

I claim:

1. The method of preparing a package of sliced cheese which consists of first subjecting the side faces of separate slices to heat to draw the butter fat to the surface thereof, immediately thereafter chilling said faces, assembling the slices into stacked relationship and wrapping the stack.

2. The method of preparing process cheese for packaging which consists of slicing the cheese into slices, passing the slices between heated rolls, immediately thereafter chilling the slices, assembling the slices into stacked relationship and wrapping the stack.

3. The method of preparing process cheese for packaging which consists of slicing the cheese into slices, passing the slices consecutively between heated rolls to draw butter fat to the surface thereof, immediately thereafter passing the slices between chilled rolls, assembling the slices into stacked relationship and wrapping the stack.

4. The method of packaging cheese which consists of slicing the cheese into slices, passing the slices between rolls heated to a temperature of approximately 180° F., immediately thereafter passing the slices between rolls chilled to a temperature of about 30° F., assembling the slices in stacked relationship, and wrapping the stack of slices.

5. An apparatus for preparing a cheese slice for packaging comprising a pair of opposed rolls between which cheese slices may be passed to contact the surfaces thereof, means for heating said rolls, a second pair of rolls arranged to receive the slices immediately after they have passed through the first pair of rolls, means for chilling the second pair of rolls, a conveyor arranged to receive the slices after they have pased through the second pair of rolls, and scrapers arranged adjacent said rolls for preventing the slices from adhering thereto, one of the scrapers on the second pair of rolls being so arranged as to be conducive to cause the slice to drop flatwise onto the conveyor.

6. The method of preparing a package of sliced cheese which consists of first subjecting the sides faces of separate slices to heat so as to draw a small film of butter fat to the surface thereof allowing the slice to cool, assembling the slices in side face to side face relationship and wrapping the slices together to form a package.

7. The method of preparing a cheese slice for packaging which consists of first subjecting the side faces of a slice to heat so as to draw a small film of butter fat to the surface thereof, allowing the slice to cool, assembling the slices into stacked relationship, and wrapping the same.

8. The method of preparing a package of sliced cheese which consists of slicing cool and solidified cheese into slices, subjecting the side faces of each slice to heat so as to draw the butter fat to the surface thereof, then allowing the slices to cool, assembling the slices in side face to side face relationship and wrapping the slices together.

9. The method of preparing a package of sliced cheese which consists of molding process cheese and allowing the same to cool, thereafter slicing the cheese into slices and subjecting the side faces of each slice to heat to draw the butter fat to the surface thereof, immediately thereafter chilling said faces, assembling the slices in side face to side face relationship and wrapping the slices together.

References Cited in the file of this patent

UNITED STATES PATENTS

| | | |
|---|---|---|
| 1,424,117 | Popper | July 25, 1922 |
| 1,492,388 | Popper | Apr. 29, 1924 |
| 1,947,506 | Vogt | Feb. 20, 1934 |
| 2,200,513 | Mitchel et al. | May 14, 1940 |
| 2,200,514 | Mitchel et al. | May 14, 1940 |
| 2,352,210 | Kraft | June 27, 1944 |
| 2,361,775 | Kraft | Oct. 31, 1944 |
| 2,395,531 | Bemis | Feb. 26, 1946 |